United States Patent [19]
Maeda et al.

[11] Patent Number: 5,315,526
[45] Date of Patent: May 24, 1994

[54] NUMERICALLY CONTROLLED LATHE

[75] Inventors: Yutaka Maeda; Yoshimaro Hanaki; Seiichi Iwasaka, all of Niwa, Japan

[73] Assignee: Okuma Corporation, Nagoya, Japan

[21] Appl. No.: 772,392

[22] Filed: Oct. 7, 1991

Related U.S. Application Data

[63] Continuation-in-part of Ser. No. 619,298, Nov. 28, 1990, abandoned.

[30] Foreign Application Priority Data

Dec. 7, 1989 [JP] Japan ................... 1-319114

[51] Int. Cl.⁵ .................. G06F 15/46; B23B 21/00
[52] U.S. Cl. ..................... 364/474.28; 364/474.35; 318/593; 82/134
[58] Field of Search ............. 364/182, 474.14, 474.28, 364/474.35, 474.12; 82/132-134, 137, 141, 118; 318/592-594, 632

[56] References Cited

U.S. PATENT DOCUMENTS

| | | | |
|---|---|---|---|
| 4,250,779 | 2/1981 | Feller et al. | 82/134 |
| 4,602,540 | 7/1986 | Murofushi et al. | 364/182 |
| 5,085,109 | 2/1992 | Hidehiko et al. | 82/133 |

FOREIGN PATENT DOCUMENTS 2847943 10/1979 Fed. Rep. of Germany ........ 82/137

Primary Examiner—Jerry Smith
Assistant Examiner—Steven R. Garland
Attorney, Agent, or Firm—Spensley Horn Jubas & Lubitz

[57] ABSTRACT

A numerically controlled lathe capable of machining a workpiece by numerically controlling a machining table provided with a machining tool. In order to prevent a local uneven abrasion of parts, which make a sliding contact, due to a mass production of workpieces having a simple form or a machining in a non-circular shape, there are provided a main carriage and a sub carriage. A machining tool is positioned on the sub carriage, and the sub carriage traverses on the main carriage along an axis which the main carriage and the sub carriage have in common. When a circular machining is carried out, the main carriage and the sub carriage respectively traverse by an equal amount in directions opposite to each other, and the cutting tool is constantly maintained at a position designated by an instruction. At the time of a non-circular machining, the main carriage and the sub carriage respectively traverse in directions opposite to each other; moreover, the sub carriage rapidly traverses in response to an instruction designating a location of the tool. Thus parts which make a sliding contact are evenly worn out by shifting the relative positions of both the main and sub carriages.

4 Claims, 5 Drawing Sheets

NUMERICALLY CONTROLLED LATHE

CROSS REFERENCE TO RELATED APPLICATION

This is a continuation-in-part of application Ser. No. 07/619,298 filed on Nov. 28, 1990, now abandoned.

BACKGROUND OF THE INVENTION

1. Field of the Invention

This invention relates to a numerically controlled lathe, and more particularly to a method for operating such lathe.

2. Description of the Related Art

In a numerically controlled lathe, a machining table upon which a machining tool is disposed is also numerically controlled, and a structure of such existing machining table is shown in FIG. 4.

Although not illustrated in detail in FIG. 4, a bed 10 of the lathe is equipped with a known main spindle, and this spindle rotates a workpiece with the workpiece held. In FIG. 4, the center axis of the main spindle is designated by a reference symbol O.

Furthermore, a slide table 11 is placed on the bed 10 in such a manner that the slide table can traverse in a direction parallel to the spindle or normal to this page.

On the slide table 11 is positioned a ball screw 14 rotatively supported by brackets 12, 13. This ball screw is rotated by a servo motor 16 fixed to the slide table 11 with a bracket 15, whereby it is possible to move a tool, described in later, to an arbitrary position with respect to the main spindle.

An axis of the servo motor 16 is connected with the ball screw 14 by means of a coupling 17.

A ball nut 18 is provided so as to establish an engagement with the ball screw 14, and is disposed on the carriage 20 by means of a bracket 19. On the carriage 20 is supported a capstan rest 22 rotatively and is placed in position by means of a support 21 interposed between the carriage and the capstan rest. A given tool 24 is placed on the capstan rest by a bite holder 23, and the tool 24 such as a bite, etc., is ordinarily positioned in such a manner that a cutting surface of the tool 24 is aligned with the plane of the center of the main spindle.

Accordingly, when any given instruction for tool position is issued to the motor 16, it becomes possible to travel the tool 24 to a desired position in connection with the center 0 of the main spindle.

However, in accordance with the above-described conventional numerical controlled lathe, when a mass production is carried out for workpieces having a simple shape or a non-circular machining is performed, there has been drawbacks in that parts of the machining table which make a sliding contact are locally worn out because the carriage 20 repeatedly makes a reciprocating motion within a limited short range. Particularly, it has been a problem in that a part of the ball screw 14 is unevenly worn out, though the rest of the part maintains a sufficient accuracy. With this result, in view of the overall structure of the lathe, the mechanical life of the machining table is extraordinarily shorten by the aforementioned local abrasion of the parts.

Another drawback, in accordance with the existing numerically controlled lathe, lies in that since all of the elemental parts from the carriage 20 to the tool 24 make a high speed reciprocating motion, and since the inertia of the parts becomes large, there is a limitation for increasing the traverse speed of the parts.

SUMMARY OF THE INVENTION

This invention is made to solve the above-described drawbacks with the prior art, and the object of the present invention is to provide a numerically controlled lathe having a machining table, a structure of which is superior in the high speed response without causing a local abrasion on a ball screw or parts which make a sliding contact.

To achieve the above aim, in accordance with one aspect of the present invention, there is provided a machining table being consisted of a main carriage and a sub carriage, and both of these carriages are disposed in such a manner as to traverse along a travel axis which the main carriage and the sub carriage have in common with directions opposite to each other; moreover, each of the traverse movement of each carriage can be controlled independently.

Consequently, according to the present invention, since it is possible to control the main carriage and the sub carriage independently, the main carriage and the sub carriage are automatically moved by an equal amount in directions opposite to each other as the time elapses, whereby it becomes possible to realize that the machining tool is held at a given position with shifting the position of the ball screw or the parts which make a sliding contact to a different position as time elapses.

Accordingly, it is possible to increase life of the apparatus as a whole by averaging the uneven abrasion of the ball screw or the parts which make a sliding contact.

The independent control of the main carriage and the sub carriage allows the sub carriage to traverse and perform a machining at the time of a non-circular machining. With this result, it becomes possible to traverse tools for machining with a less inertia, thereby advantageously securing a traverse speed faster than that of the prior art.

Other objects and advantages of the present invention will be apparent to those skilled in the art from the following description with reference to the appended drawings.

DETAILED DESCRIPTION OF THE INVENTION

Referring to the accompanying drawings, a numerically controlled lathe in accordance with one preferred embodiment of the present invention will not be explained.

Figure 1:
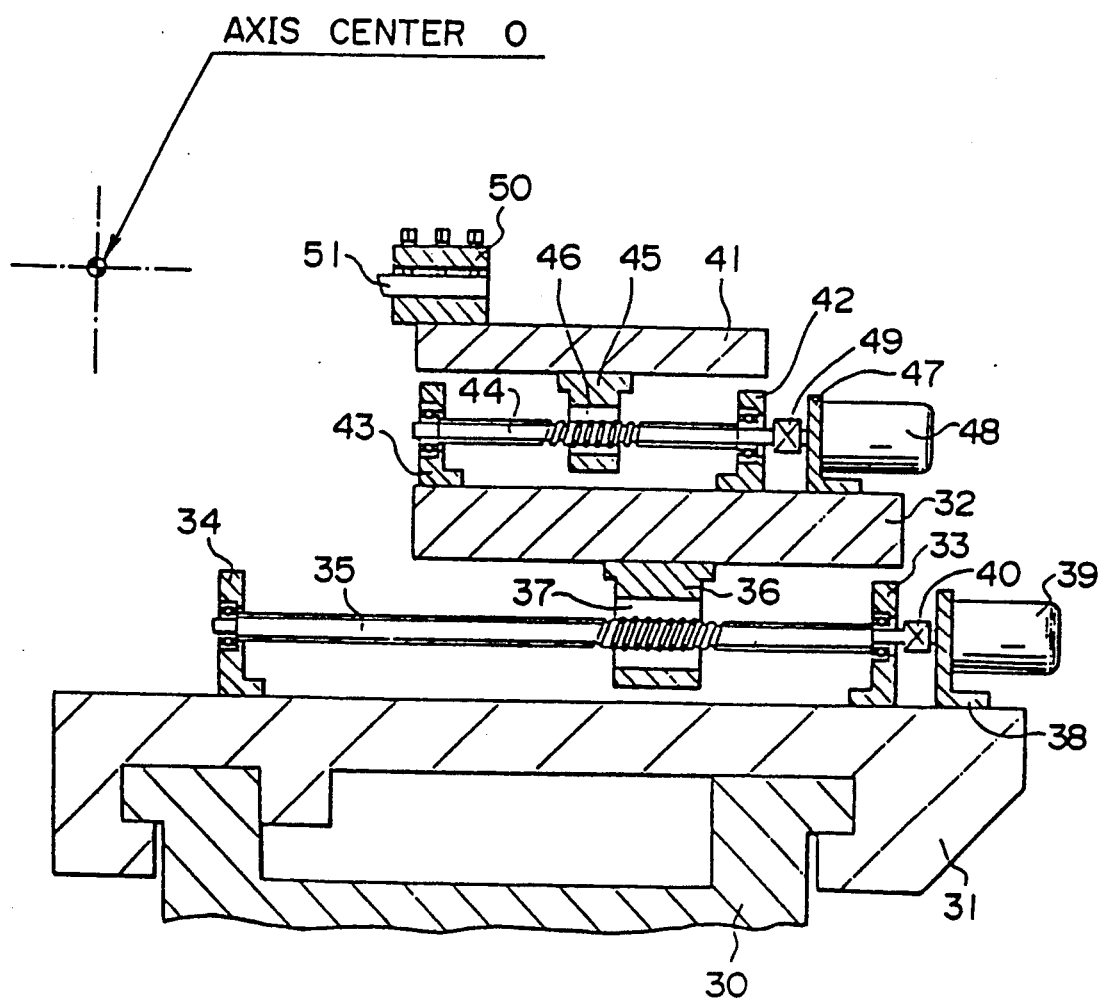
FIG. 1 is a schematic cross sectional plan view fully illustrating a machining table of a numerically controlled lathe in accordance with one preferred embodiment of the present invention.

FIG. 1 is a schematic cross sectional plan view illustrating a numerically controlled lathe in accordance with one preferred embodiment of the present invention, and in which drawing a structure of a machining table of the embodiment is shown in detail.

Like in the prior art, a bed 30 is provided with a non-illustrated main spindle, and the center O of the spindle is shown in FIG. 1.

A slide table 31 is placed on the bed 30 in such a manner as to slidably travel over the bed in a direction parallel to the spindle, namely, in a direction normal to this page. In addition, a main carriage 32 is positioned on the slide table 31 in such a manner as to slidably traverse leftwards and rightwards, that is, in a direction normal to the main spindle.

The main carriage 32 has a similar installation mechanism that with the prior art. Specifically, the main carriage 32 is supported over the slide table 31 by engaging a ball screw, rotatively supported by brackets 33, 34 which are mounted on the slide table 31, with a ball nut 37 supported over the main carriage by a bracket 36.

The ball screw 35 is fixedly linked to a shaft of a servo motor 39, which is secured by the bracket 38 by means of a coupling 40, and it is possible to traverse and place the main carriage 32 in position for performance in both right and left in the drawing, by being rotated by motor 39.

A feature of the present invention is in that the sub carriage 41 is positioned over the main carriage 32 in such a manner as to slidably traverse along a travel axis which the main and the sub carriages have in common. As a result, it will be appreciated that a traverse in both directions of right and left in the drawing, namely, a traverse in a direction normal to the main spindle, is realized by the combination of the traverse movements of the main carriage 32 and the sub carriage 41.

In FIG. 1, the brackets 42, 43 are mounted on the main carriage 32, and these brackets 42, 43 rotatively suspend the sub ball screw 44; moreover, the sub ball nut 46 supported by the bracket 45, which is mounted upon the sub carriage 41, engages with the sub ball screw 44.

Upon the main carriage 32 is placed a sub motor 48 by a bracket 47, and the shaft of the motor 48 and the sub ball screw 44 are fixedly linked together by a coupling 49.

With this structure, the traverse movement of the sub carriage 41 is controlled by the sub motor 48 independent of the main carriage 32.

On the sub carriage 41 is securely positioned a machining tool 51 such as a bite, etc., by means of a bite holder 50, and in accordance with the embodiment illustrated in FIG. 1, the cutting surface of the tool 51 is aligned with the plane of the spindle center O.

Figure 2:
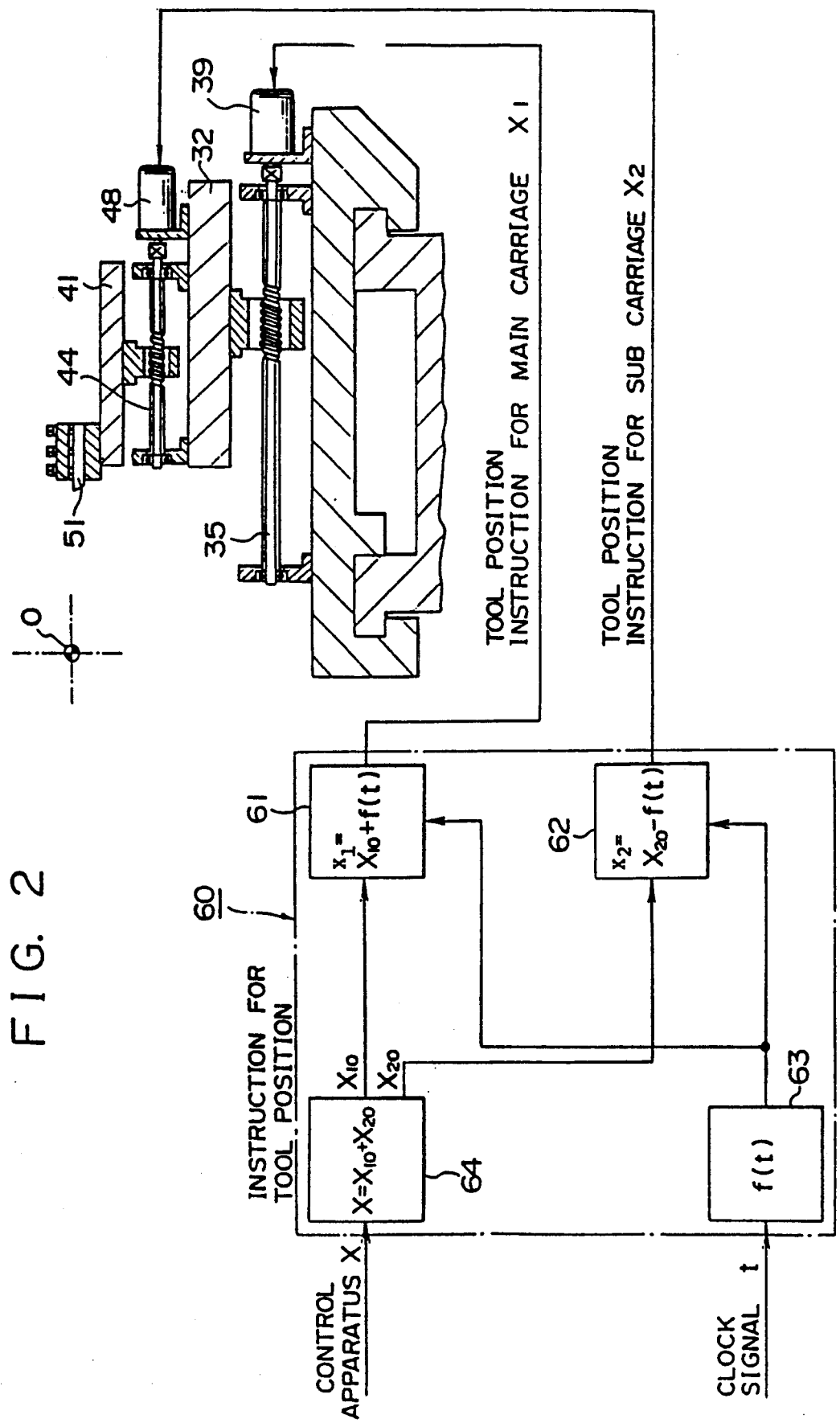
FIG. 2 is a view illustrating an overall structure of the numerically controlled lathe of FIG. 1 including a control device.

FIG. 2 shows a traverse movement control mechanism of the main and the sub carriages in accordance with the embodiment of the present invention illustrated in FIG. 1. In FIG. 2, a control apparatus 60 issues a given instruction of tool position to both of the motors 39 and 48.

To the control apparatus 60 is supplied an instruction X concerning a tool position from the NC controller, and a position of the tool 51 is controlled in response to this positional instruction X.

FIG. 2 shows a state of controlling a circular machining, in which the tool position instruction X is divided into a basic position instruction $X_{10}$ of the main carriage and a basic position instruction $X_{20}$ of the sub carriage by a distributing calculator 64 and these two instructions are respectively supplied to the main calculator 61 and the sub calculator 62. Each instruction is subject to a positional displacement which has an equal amount with a different direction, and is transferred to the motor 39 and the motor 48 as a position instruction $X_1$ for the main carriage and a position instruction $X_2$ for the sub carriage, respectively.

In the embodiment, the displacement in equal amount having a different direction is supplied from a displacement generator 63 incorporated in the control apparatus 60 to the calculators 61 and 62, thereafter this displacement generator 63 performs a predetermined calculation on the basis of a clock signal t, and an output f(t) is added to both the basic position instruction $X_{10}$ of the main carriage with a positive phase and the basic position instruction $X_{20}$ of the sub carriage with a negative phase.

In short, the calculator 61 adds the displacement f(t) to the basic position instruction $X_{10}$ relative to the main carriage 32, whereas the sub calculator 62 subtracts the f(t) from the basic position instruction $X_{20}$ relative to the sub carriage 41, respectively outputting position instructions $X_1$ and $X_2$.

Therefore, the sum of the position instructions $X_1$ and $X_2$ becomes X, and it is possible to prevent a local abrasion of the ball screws or the parts which make a sliding contact by relatively shifting the locations of the main carriage 32 and the sub carriage 41 with the tool 51 placed in position constantly, thereby increasing life of the apparatus as a whole with utilizing all of the parts which make a sliding contact uniformly.

FIG. 3 designates a state in which the positions of the main carriage 32 and the sub carriage 41 are controlled in such a manner that the main carriage shifts to the direction opposite to that of the sub carriage with a distance R between the tool 51 and the spindle center O maintained constantly.

Figure 3A:
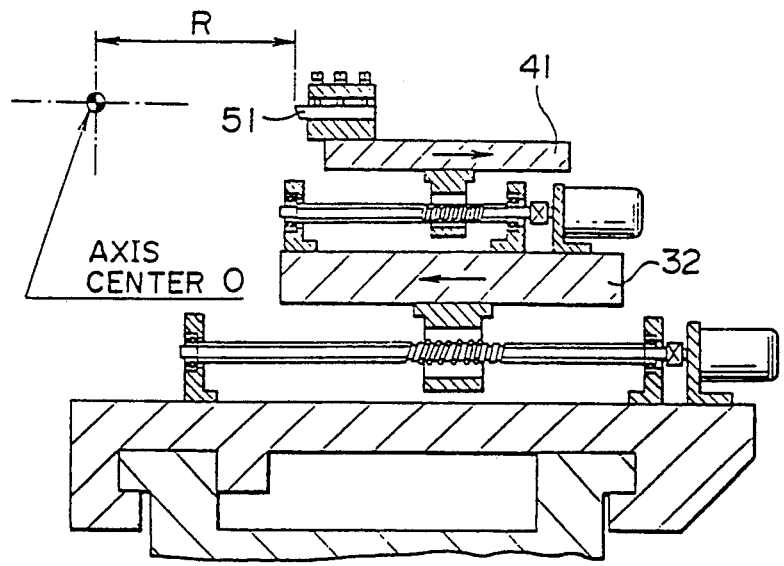
FIGS. 3A, 3B, 3C are explanatory views each of which illustrates an operation of the embodiment of the present invention.
Figure 3B:
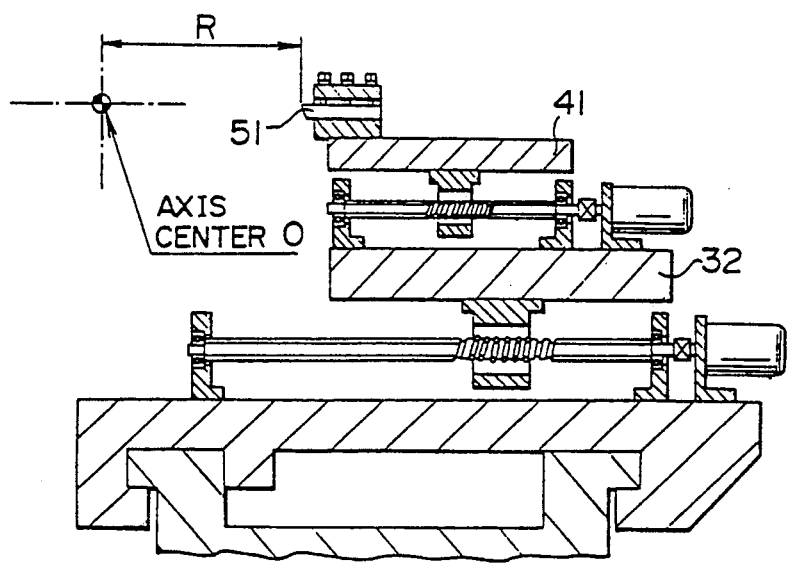

Particularly, when FIG. 3B is viewed as a standard arrangement, FIG. 3A shown a state in which the main carriage shifts leftwards whereas the sub carriage 41 shifts rightwards denoted by arrows. As a result, it is possible to maintain the tool 51 at a given position by the relative positional displacements of both the main carriage 41 and the sub carriage 32.

Figure 3C:
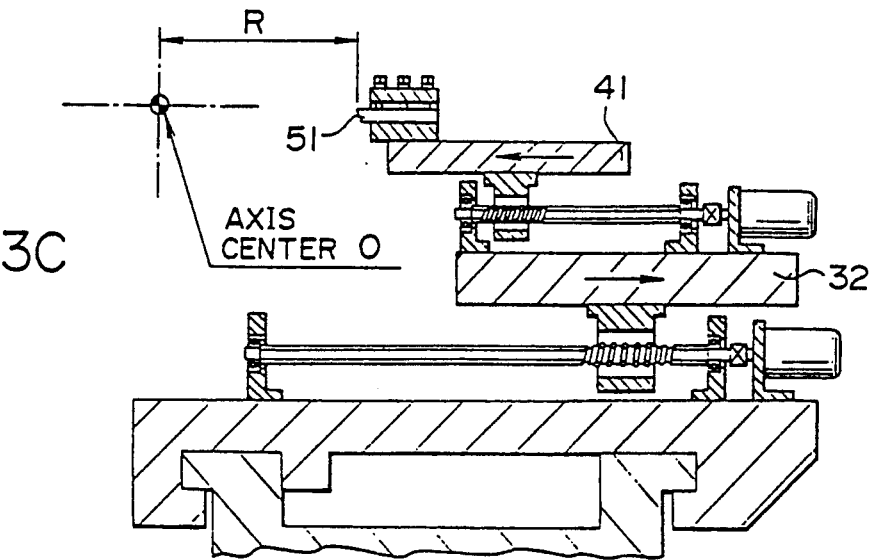
Figure 4:
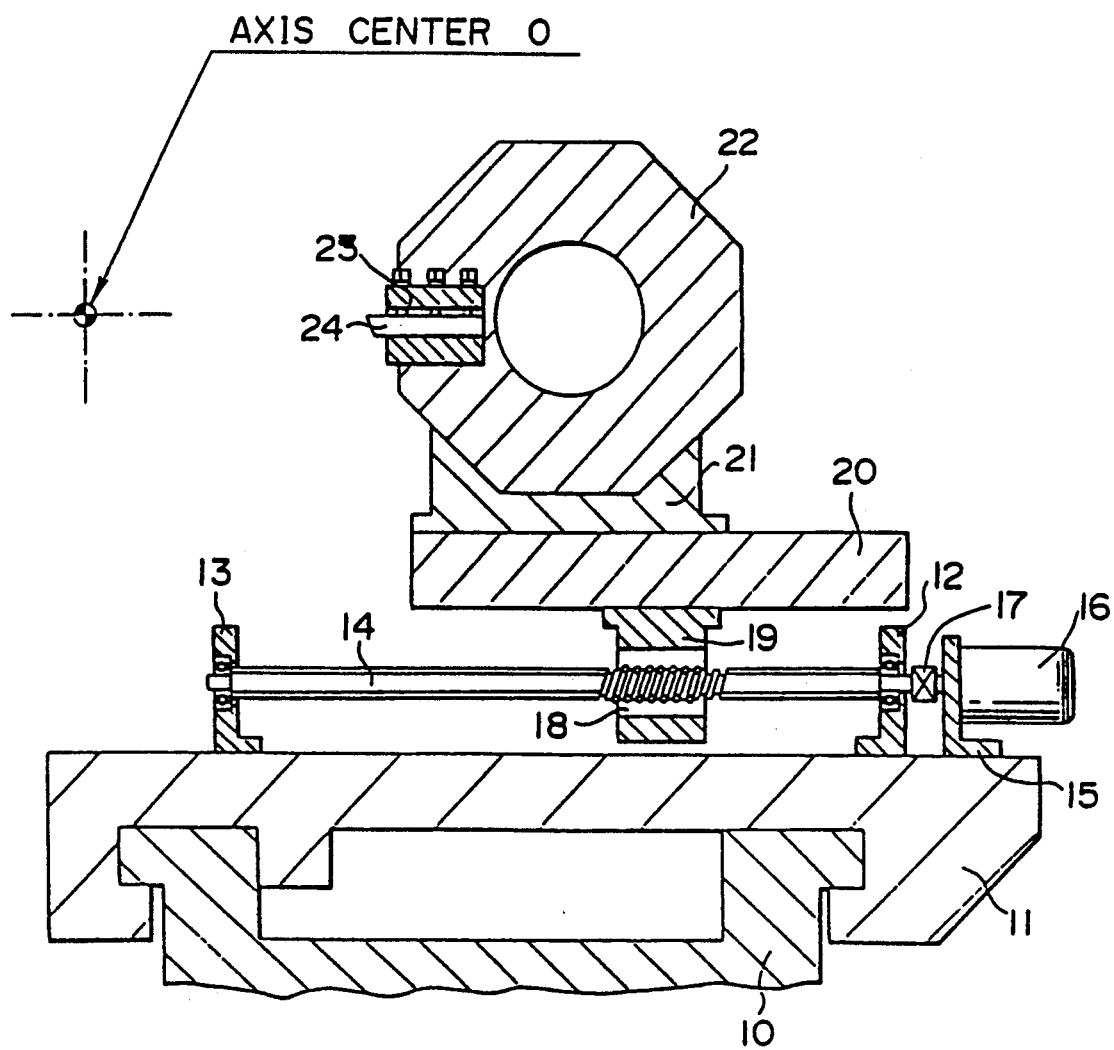
FIG. 4 is a schematic cross sectional view illustrating an example of an existing machining table for use in lathe.

Meanwhile, FIG. 3C, on the contrary to FIG. 3A, illustrates a state in which the main carriage 32 shifts rightwards, while the sub carriage 41 shifts leftwards. In this state, it is also possible to keep a constant distance R between the tool 51 and the center O of the spindle.

In practice, in accordance with the present invention, it is possible to change the relationship of the relative positions between the main carriage 32 and the sub carriage 41 by shifting the locations of the carriages by an equal amount in a direction opposite to each other as time elapses without changing the distance R between the center O of the main spindle and the tool 51. Thereby, it becomes possible to prevent a local uneven abrasion of the parts which make a sliding contact without fail by performing a machining with changing the positions of the ball screws 35, 44.

Figure 2A:
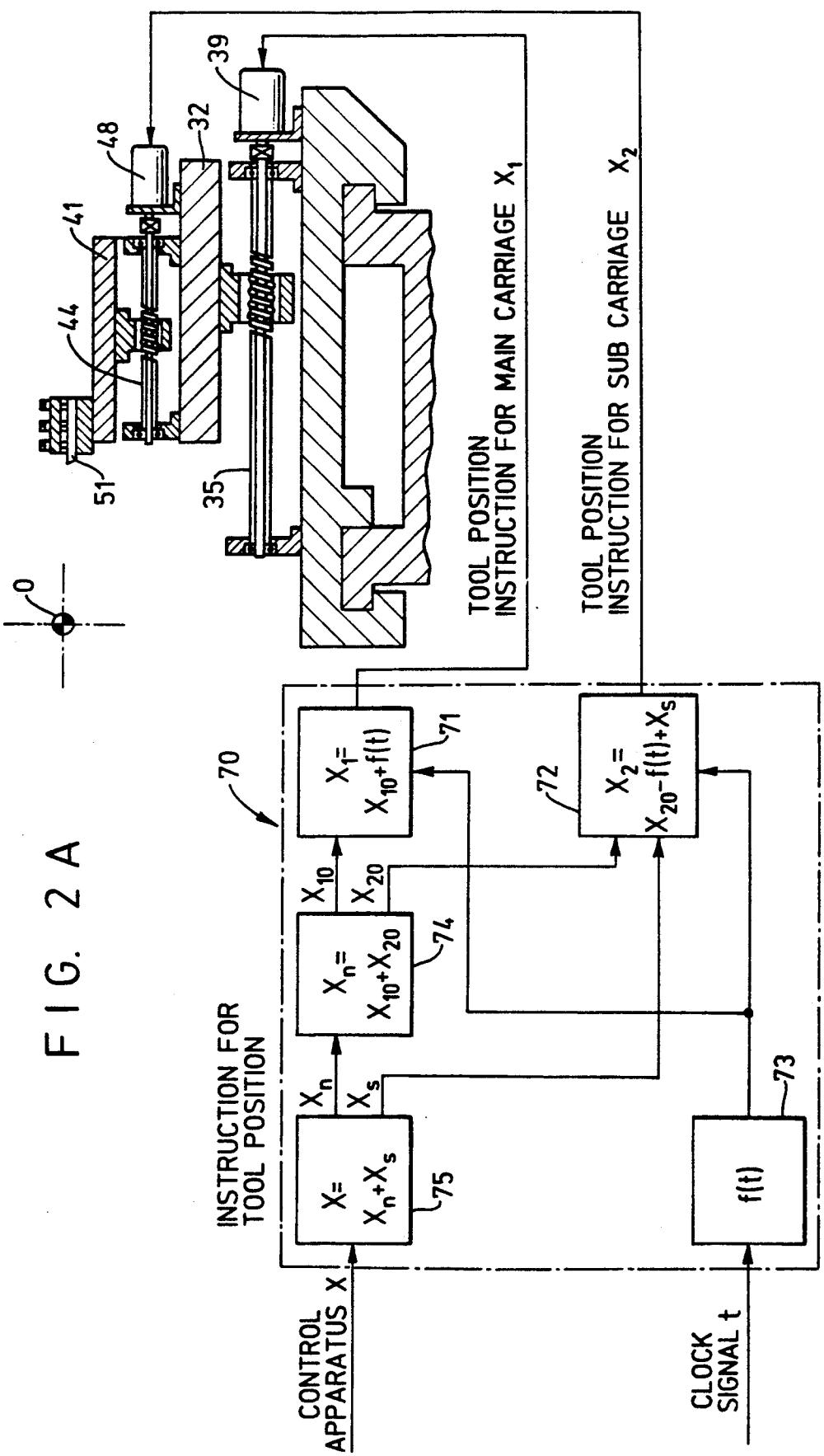
FIG. 2A is a view similar to that of FIG. 2 of another embodiment having a modified control device.

Moreover, in the case of non-circular machining, high-speed reciprocal movement synchronous with a rotational movement of the main spindle can be effected exclusively by means of the sub carriage. FIG. 2A schematically illustrates a driving method at the time of non-circular machining.

A position instruction X for machining tool 51 is supplied to a control device 70 and a calculator 75 of control device 70 divides the position instruction X of the machining tool into a position instruction Xn of the machining tool for normal machining asynchronous with the rotational position of the main spindle and a position instruction Xs for the non-circular machining which is changed in synchronism with rotational, or angular, position of the main spindle, that is, represented by $$X = Xn + Xs$$

and these instructions Xn and Xs are delivered to calculators 74 and 72, respectively.

The calculator 74 of the control device 70 divides instruction Xn into a reference position instruction X10 of the main carriage 32 and a reference position instruction X20 of the sub carriage 41, that is, represented by $$Xn = X10 + X20$$

and the position instructions X10 and X20 are delivered to the calculators 71 and 72, respectively.

The calculator 73 of the control device 70 generates a position correction value f (t) from a clock signal t of the numerical controller device, and the correction value f (t) is delivered to both the calculators 71 and 72.

The calculator 71 of the control device 70 generates a position instruction X1 for main carriage 32 by adding the position correction value f (t) to the reference position instruction X10. At this time, the calculator 72 generates a position instruction X2 for sub carriage 41 by subtracting the position correction value f (t) from the reference position instruction X20 and adding the position instruction Xs at the time of non-circular machining to the subtracted value. Thereby, the instructions X1 and the X2 are issued to motor 39 for driving main carriage 32 and motor 48 for driving sub carriage 41, respectively.

As a result, the position of machining tool 51 fixed at the sub carriage 41 is maintained at the location of the position instruction of the machining tool, namely at X=X1+X2.

Consequently, in the case of a machining such as a non-circular machining liable to a local abrasion of the ball screw or the parts which makes a sliding contact, it is possible to realize an even abrasion of the parts by automatically shifting the relative positions between the main carriage 32 and the sub carriage 41 as time elapses.

Furthermore, according to the present invention, it is possible to make only the sub carriage 41 traverse at the time of the non-circular machining, and since a desired non-circular machining is achieved merely by using the sub carriage having a small inertia, it becomes possible to secure a high speed response when a machining is performed.

As described above, according to the numerically controlled lathe in accordance with the present invention, it becomes possible to increase life of the lathe by averaging the abrasion, which occurs at a ball screw or the parts which make a sliding contact.

Another advantage of the present invention, it becomes possible to increase a speed of a response of the machining table when performing a non-circular machining, and to perform a machining with high speed and high efficiency, thereby reducing a machining time.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for operating a main carriage and a sub carriage of a numerically controlled lathe in which the main carriage is displaceable along an axis, and the sub carriage is movable relative to the main carriage along the axis, the sub carriage being arranged to carry a tool which is positioned on the axis, said method comprising:
   providing a position instruction, X, representing the desired position, relative to a reference position of the tool, along the axis;
   deriving from position instruction X, a main carriage reference position instruction $X_{10}$ and a sub carriage reference position instruction $X_{20}$, in which $$X = X_{10} + X_{20};$$

generating a time varying position correction instruction f(t) from a clock signal;
   generating a first carriage position instruction by adding together one of the reference position instructions and the time varying position correction instruction;
   generating a second carriage position instruction by subtracting from the other reference position instruction the time varying position correction instruction; and
   supplying one of the carriage position instructions to the main carriage and the other carriage position instruction to the sub carriage so as to position the machine tool so that, at all times, the position represented by X is equal to the sum of the positions represented by the first and second carriage position instructions.

2. A method as defined in claim 1 wherein $X_{10}$ represents the desired position of the main carriage relative to the reference position and $X_{20}$ represents the desired position of the sub carriage relative to the main carriage.

3. A method for operating a numerically controlled lathe in order to machine a workpiece by contacting the workpiece with a tool as the workpiece rotates about an axis in order to give the workpiece a noncircular cross section, the lathe including a main carriage displaceable along an axis, and a sub carriage movable relative to the main carriage along the axis, the tool being carried by the sub carriage and being disposed on the axis, said method comprising:
   providing a position instruction, X, representing the desired position, relative to a reference position of the tool, along the axis;
   deriving from position instruction X, a position instruction component $X_n$ which is asynchronous with the workpiece rotation and a position instruction component $X_s$ which varies in synchronism with rotation of the workpiece, in which $$X = X_n + X_s;$$

deriving from instruction component $X_n$, a main carriage reference position instruction $X_{10}$ and a sub carriage reference position instruction $X_{20}$, in which $$X_n = X_{10} + X_{20};$$

generating a time varying position correction instruction f(t) from a clock signal;

generating a first carriage position instruction and a second carriage position instruction from the position instruction component $X_s$, the reference position instructions and the time varying position correction instruction, such that the time varying position correction instruction is added to and subtracted from respective ones of the reference position instructions, and the position instruction component $X_s$ is added to one of the reference position instructions to form the carriage position instructions; and supplying each carriage position instruction to a respective one of the main carriage and the sub carriage for positioning the carriages so that the tool is at the position represented by X and X is equal to the sum of the first and second carriage position instructions.

4. A method as defined in claim 3 wherein the first carriage position instruction equals $X_{10} + f(t)$ and is supplied to the main carriage and the second carriage position instruction equals $X_{20} - f(t) + X_s$ and is supplied to the sub carriage.

* * * * *